United States Patent
Bender et al.

(10) Patent No.: US 10,984,796 B2
(45) Date of Patent: Apr. 20, 2021

(54) OPTIMIZED INTERACTIVE COMMUNICATIONS TIMING

(71) Applicant: International Business Machines Corporation, Armonk, NY (US)

(72) Inventors: Michael Bender, Rye Brook, NY (US); Craig M. Trim, Ventura, CA (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 16/431,100

(22) Filed: Jun. 4, 2019

(65) Prior Publication Data
US 2020/0388277 A1 Dec. 10, 2020

(51) Int. Cl.
*G10L 15/22* (2006.01)
*G10L 25/63* (2013.01)
*G10L 15/18* (2013.01)

(52) U.S. Cl.
CPC .......... *G10L 15/22* (2013.01); *G10L 15/1815* (2013.01); *G10L 25/63* (2013.01); *G10L 2015/223* (2013.01)

(58) Field of Classification Search
CPC ................. G10L 15/00–15/34; G10L 25/63
See application file for complete search history.

(56) References Cited

U.S. PATENT DOCUMENTS

| | | | |
|---|---|---|---|
| 6,227,931 B1* | 5/2001 | Shackelford | A63H 3/52 434/156 |
| 10,791,178 B1* | 9/2020 | Srinivasa Ragavan | G06F 40/295 |
| 2009/0248694 A1* | 10/2009 | Martinez | G06F 16/243 |
| 2017/0118348 A1 | 4/2017 | Dotan-Cohen | |
| 2017/0243465 A1 | 8/2017 | Bourne, Jr. | |
| 2018/0075493 A1* | 3/2018 | Agarwal | G06Q 30/0261 |
| 2018/0165593 A1 | 6/2018 | Stolarz | |
| 2018/0373487 A1 | 12/2018 | Gruber | |

OTHER PUBLICATIONS

Elliott, Matt, "3 ways to stop iOS notifications from interrupting music playback", Dec. 2, 2016, Cnet, 7 pps., <https://www.cnet.com/how-to/3-ways-to-stop-ios-notitications-from-interrupting-music-playback/>.

(Continued)

*Primary Examiner* — Abul K Azad
(74) *Attorney, Agent, or Firm* — Donald G. Weiss

(57) ABSTRACT

In an approach to optimized interactive communications timing from computing devices, a set of system defaults is received. A verbal communications for an intended recipient is received. An activity data for the intended recipient is received. A criticality score of the verbal communication is determined based on the set of system defaults. An availability score for the intended recipient is determined based on the set of system defaults and the activity data. An optimal time to initiate verbal communications with the intended recipient is determined wherein the optimal time to initiate verbal communications occurs when the criticality score exceeds the availability score. The verbal communication for the intended recipient is initiated at the optimal time.

20 Claims, 4 Drawing Sheets

(56) References Cited

OTHER PUBLICATIONS

Lobo, Freia, "Amazon just added notification alerts to Alexa, which is the worst feature ever", Mashable, Inc., May 16, 2017, 6 pps., <https://mashable.com/2017/05/16/alexa-notifications-announcement/#Cbtryhx3dmqZ>.

McLeod, Saul, "Likert Scale", SimplyPsychology, published 2008, 5 pps., <https://www.simplypsychology.org/likert-scale.html>.

Perone, Christian, "Machine Learning: Cosine Similarity for Vector Space Models (Part III)", Blog, Dec. 2013, Retrieved on Feb. 17, 2019, <http://blog.christianperone.com/2013/09/machine-learning-cosine-similarity-for-vector-space-models-part-iii/>.

* cited by examiner

| EVENT | CRITICALITY SCORE | AVAILABILITY SCORE |
|---|---|---|
| 1 | 9 | 1 |
| 2 | 5 | 6 |
| 3 | 3 | 7 |

FIG. 3

OPTIMIZED INTERACTIVE COMMUNICATIONS TIMING

BACKGROUND

The present invention relates generally to the field of data processing, and more particularly to optimized timing for interactive communications from computing devices.

In the current state of computing technology, many devices interact with people through verbal communications. These verbal communications may be one way, i.e., an announcement from a computing device to a person, or may be two-way, i.e., a conversation between a computing device and a person. As more people adopt interactive computing devices such as smart speakers, there are more opportunities to interact verbally with these computing devices. In addition, verbal communications by computing devices are becoming more commonplace, with more types of computing devices incorporating verbal communications, again leading to increased opportunities for computing devices to interact verbally with people.

These computing devices typically can communicate and interact with other devices over the Internet; hence the term Internet of Things (IoT) is used to describe physical devices and everyday objects that are connected to the Internet. In the consumer space, the concept of the "smart home" has computing devices, e.g., smart speakers, connected to the IoT, allowing for a wide range of verbal interaction with these devices.

SUMMARY

Embodiments of the present invention disclose a method, a computer program product, and a system for optimized interactive communications timing from computing devices. In one embodiment, a set of system defaults is received. A verbal communication for an intended recipient is received. An activity data for the intended recipient is received. A criticality score of the verbal communication is determined based on the set of system defaults. An availability score for the intended recipient is determined based on the set of system defaults and the activity data. An optimal time to initiate verbal communications with the intended recipient is determined, wherein the optimal time to initiate verbal communications occurs when the criticality score exceeds the availability score. The verbal communication for the intended recipient is initiated at the optimal time.

BRIEF DESCRIPTION OF THE DRAWINGS

FIG. 3 is a table depicting three sample use cases for the optimized communications program, in accordance with an embodiment of the present invention.

DETAILED DESCRIPTION

Figure 1:
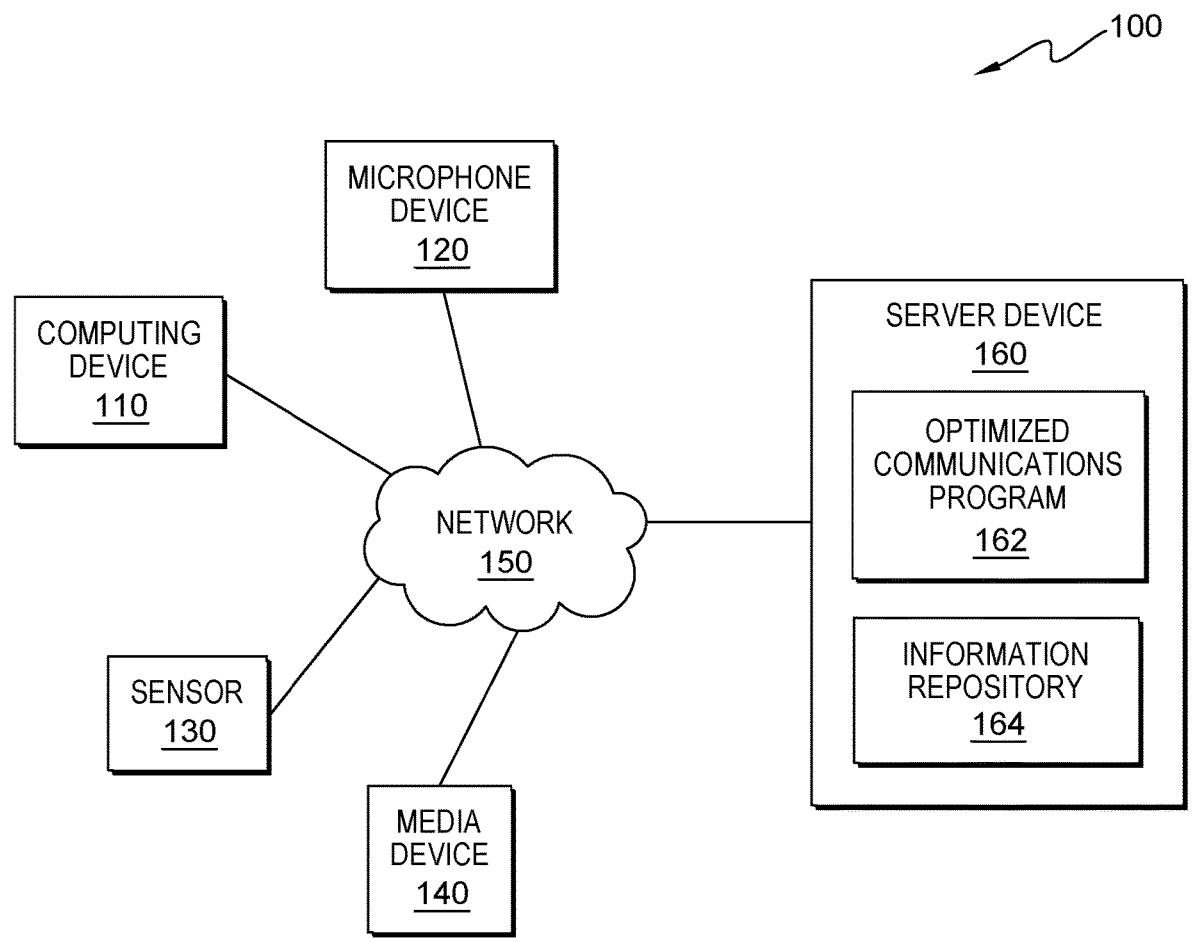
FIG. 1 is a functional block diagram illustrating a distributed data processing environment, in accordance with an embodiment of the present invention.

Interactive communication with computing devices is commonplace today. When interacting with another person, people will compare the urgency of the communications with the availability of the person before initiating a new conversation. For example, a person will typically wait for another person to finish a sentence before interrupting, unless the urgency of the pending communications is higher than the urgency of the ongoing conversation (e.g., a person will interrupt almost any conversation to communicate "I'm bleeding and need to go to the hospital"). People take this for granted, and automatically calculate the optimal time to start a communication.

Computing devices, on the other hand, typically deliver communications when the message is ready to be delivered, regardless of the availability of the recipient. An ongoing conversation between the recipient and another person will be interrupted, regardless of the relative importance of the pending communications as compared to the ongoing conversation. The information that a computing device can deliver has different levels of urgency (e.g., the laundry is done vs. the cake should come out of the oven), and based on the urgency, the delivery of the information has different windows as to when this information can be delivered. If the person is engaged in other activities (e.g., watching a football game or in the middle of a conversation), there is a need to manage the timing of the communications to minimize the level of intrusion.

Embodiments of the present invention recognize that improvements can be made to interactive communications with computing devices by calculating an optimal time to initiate a communication by comparing the urgency of the pending communication with the current/planned availability of the recipient. Implementation of embodiments will determine the criticality of the communication, the availability of the recipient, and an open window for initiating the communication. In some embodiments, the system will also ingest local laws and rules as related to communications. For example, as smart systems become more prevalent and seamless, a user might transition to his or her car where there are laws in place restricting the type of vocal feedback a car system can give a driver. In this example, the laws would override the availability of the recipient and prevent delivery of the communication until such time as the laws allow the delivery. Implementation of embodiments of the invention may take a variety of forms, and exemplary implementation details are discussed subsequently with reference to the Figures.

As referred to herein, all data retrieved, collected, and used is used in an opt in manner, i.e., the data provider has given permission for the data to be used. For example, the installation procedure for a microphone device that would be used to capture speech audio from a user could include an option that must be selected by the owner to allow the device to capture audio and use the captured audio to compute an optimal time to initiate a pending communication. As another example, the system could request approval from the owner of the computing device before capturing audio. Any data or information used for which the provider has not opted in is data that is publicly available.

FIG. 1 is a functional block diagram illustrating a distributed data processing environment, generally designated 100, suitable for operation of optimized communications program 162 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, microphone device 120, sensor 130, media device 140, and server device 160, all interconnected over network 150. Network 150 can be, for example, a telecommunications network, a local area network (LAN), a wide area network (WAN), such as the Internet, or a combination of the three, and can include wired, wireless, or fiber optic connections. Network 150 can include one or more wired and/or wireless networks that are capable of receiving and transmitting data, voice, and/or video signals, including multimedia signals that include voice, data, and video information. In general, network 150 can be any combination of connections and protocols that will support communications between computing device 110, microphone device 120, sensor 130, media device 140, server device 160, and other computing devices (not shown) within distributed data processing environment 100.

Computing device 110 represents one or more computing devices with which server device 160 communicates, via network 150. In an embodiment of the invention, computing device 110 may be an IoT device, such as a smart speaker, which is capable of delivering an audio message to a user. Computing device 110 can be a laptop computer, a tablet computer, a smart phone, or any programmable electronic device capable of capturing audio and other data and communicating with various components and devices within distributed data processing environment 100, via network 150.

Microphone device 120 represents one or more microphone devices with which server device 160 communicates, via network 150. In an embodiment, microphone device may be a microphone in a smart speaker, a smart phone, laptop computer, or web cam, or any other device capable of capturing audio data and communicating with various components and devices within distributed data processing environment 100, via network 150.

Sensor 130 represents one or more sensors with which server device 160 communicates, via network 150. Sensor 130 can be a motion sensor, temperature sensor, moisture sensor, occupancy sensor, proximity sensor, light sensor, touch sensor, or any other sensor capable of interacting with server device 160 to provide physical data. For example, sensor 130 may be an occupancy sensor that detects when the intended recipient of a communication is present. In another example, sensor 130 may be a wearable device, for example a heart rate monitor in a smart watch that is capable of collecting biometric data from the user and transmitting that data to server device 160 via network 150.

Media device 140 represents one or more media devices with which server device 160 communicates, via network 150. A media device is an electronic device used to receive sound, images, or a combination of both and present them to a user. The source can be local, such as removable media (e.g., DVD) or embedded storage, or can be received from a remote location via wired or wireless communications, such as network 150. Media device 140 can be a television, laptop computer, a tablet computer, a smart phone, an Internet of Things (IoT) device, smart speaker, or any programmable electronic device capable of capturing audio and other data and communicating with various components and devices within distributed data processing environment 100, via network 150. In an embodiment, media device 140 may be a television that receives programming via a cable service and broadcasts audio within the range of microphone device 120.

In an embodiment, computing device 110, microphone device 120, sensor 130, and media device 140 may be separate devices. In another embodiment, computing device 110, microphone device 120, sensor 130, and media device 140 may be integrated into other devices. For example, microphone device 120 may be integrated into computing device 110. In another example, both microphone device 120 and sensor 130 may be integrated into another device, such as media device 140. In an embodiment, distributed data processing environment 100 may include any number of computing device 110, microphone device 120, sensor 130, and media device 140.

Server device 160 can be a standalone computing device, a management server, a web server, a mobile computing device, or any other electronic device or computing system capable of receiving, sending, and processing data. In other embodiments, server device 160 can represent a server computing system utilizing multiple computers as a server system, such as in a cloud computing environment. In another embodiment, server device 160 can be a laptop computer, a tablet computer, a netbook computer, a personal computer (PC), a desktop computer, a personal digital assistant (PDA), a smart phone, or any programmable electronic device capable of communicating with computing device 110, microphone device 120, sensor 130, media device 140, and other computing devices (not shown) within distributed data processing environment 100 via network 150. In another embodiment, server device 160 represents a computing system utilizing clustered computers and components (e.g., database server computers, application server computers, etc.) that act as a single pool of seamless resources when accessed within distributed data processing environment 100.

Server device 160 includes optimized communications program 162. Although optimized communications program 162 is depicted in FIG. 1 as being integrated with server device 160, in alternative embodiments, optimized communications program 162 may be remotely located from server device 160. For example, optimized communications program 162 can be integrated with another computing device (not shown) connected to network 150. Server device 160 may include internal and external hardware components, as depicted and described in further detail with respect to FIG. 4.

In an embodiment, server device 160 includes information repository 164. In an embodiment, information repository 164 may be managed by optimized communications program 162. In an alternative embodiment, information repository 164 may be managed by the operating system of server device 160, alone, or together with, optimized communications program 162. In some embodiments, information repository 164 is located externally to server device 160 and accessed through a communication network, such as network 150. In some embodiments, information repository 164 is stored on server device 160. In some embodiments, information repository 164 may reside on another computing device (not shown), provided that information repository 164 is accessible by server device 160. Information repository 164 includes, but is not limited to, audio data, sensor data, media data, calendar data, and other data that is received by optimized communications program 162 from one or more sources, and data that is created by optimized communications program 162.

Information repository 164 may be implemented using any volatile or non-volatile storage media for storing information, as known in the art. For example, information repository 164 may be implemented with a tape library, optical library, one or more independent hard disk drives, multiple hard disk drives in a redundant array of independent disks (RAID), solid-state drives (SSD), or random-access memory (RAM). Similarly, information repository 164 may be implemented with any suitable storage architecture known in the art, such as a relational database, an object-oriented database, or one or more tables.

In an embodiment, optimized communications program 162 may establish defaults for the priority of devices and applications within distributed data processing environment 100. In an embodiment, optimized communications program 162 may receive a communication to be delivered to an intended recipient via a device. In an embodiment, optimized communications program 162 may determine if an override is in effect to cause the communication to be initiated immediately. In an embodiment, optimized communications program 162 may determine a score for the criticality of the communication. In an embodiment, optimized communications program 162 may determine a score for the availability of the intended recipient of the communication. In an embodiment, optimized communications program 162 may compare the criticality score with the availability score to determine the optimal time to initiate the communication. In an embodiment, optimized communications program 162 may check to see if rules prohibit voice communications with the intended recipient. In an embodiment, optimized communications program 162 may, if rules do prohibit voice communications, wait until such time as the rules allow the delivery before initiating the communication with the intended recipient. In an embodiment, optimized communications program 162 may, if no rules prohibit voice communications, initiate the communication with the intended recipient at the optimal time.

Figure 2:
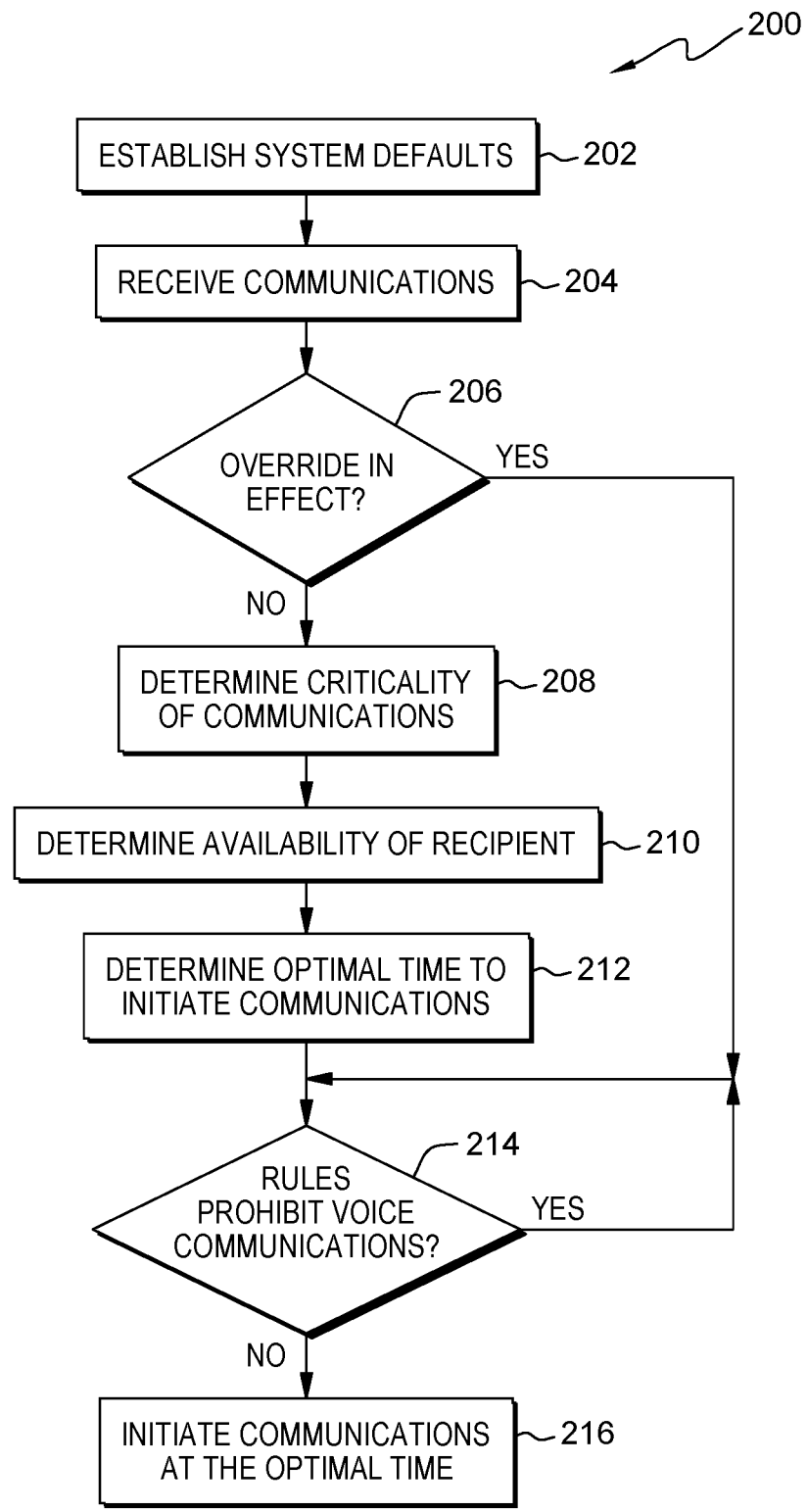
FIG. 2 is a flowchart depicting operational steps of an optimized communications program, on a remote computing device within the distributed data processing environment of FIG. 1, for optimizing timing for interactive communications from computing devices, in accordance with an embodiment of the present invention.

FIG. 2 is a flow chart diagram of workflow 200 depicting operational steps of optimized communications program 162, on server device 160 within distributed data processing environment 100 of FIG. 1, for optimizing interactive communications by a computing device, in accordance with an embodiment of the present invention. It should be appreciated that the process depicted in FIG. 2 illustrates one possible iteration of the process flow, which repeats for each communication received by optimized communications program 162. In one embodiment, the steps of the workflow are performed by optimized communications program 162. In another embodiment, the steps of workflow 200 may be performed by any other program while working with optimized communications program 162. In yet another embodiment, the steps of workflow 200 may be integrated into another program while working with optimized communications program 162. For example, the steps of workflow 200 may be integrated into a messaging application on a smart phone to override an interactive communications function of the messaging application.

It should be appreciated that embodiments of the present invention provide at least for collecting audio data, sensor data, media data, calendar data, and other data from computing device 110, microphone device 120, sensor 130, and media device 140, and determining on server device 160 the optimal time to begin interactive communications with a user. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

In an embodiment, optimized communications program 162 may receive audio data, sensor data, media data, calendar data, and other data from any number of devices capable of communicating over network 150. In an embodiment, optimized communications program 162 may use the data received to determine an optimal time to initiate the communications with the intended recipient.

Optimized communications program 162 establishes system defaults (step 202). At step 202, optimized communications program 162 establishes system priority defaults for devices or applications that may initiate communications with the user. In an embodiment, optimized communications program 162 may establish default priorities during installation of the device or application from user input for each device or application that can initiate communications. For example, when a user installs a smart speaker, part of the installation procedure may allow the user to setup default priorities for communications from that device. In an embodiment, the defaults may be time-based. The default priorities, for example, could restrict communications during hours when the user is normally sleeping, such as "do not disturb me between the hours of 11:00 PM and 5:00 AM." In another embodiment, the defaults may be score-based. An example of a score-based default could be "communications from this device are higher priority than communications from the device in the kitchen," or "this device has a default priority score of 5." In yet another embodiment, the defaults may be location-based. For example, a location-based default for a mobile device may be "do not allow verbal communications if this device is in a car unless the car is stationary." In an embodiment, optimized communications program 162 may establish default rules governing delivery of verbal communications. For example, optimized communications program 162 may establish, based on input from a user, that any communications from a child of the user are delivered immediately. In an embodiment, optimized communications program 162 may establish a threshold to establish whether to interrupt an ongoing conversation by the intended recipient.

Optimized communications program 162 receives a communication (step 204). At step 204, optimized communications program 162 receives a communication from one or more sources. In an embodiment, the one or more sources include computing device 110, microphone device 120, sensor 130, media device 140, server device 160, or any combination thereof. In another embodiment, the one or more sources may include any number of computing devices, microphone devices, sensors, or media devices (not shown) capable of communicating with server device 160 over network 150. In an embodiment, the communications may be a response to a request from a user. For example, the response may be the local weather forecast in response to a request from a user for the weather. In another embodiment, the communications may be a notification from a smart appliance. For example, the response may be a notification from a smart washing machine that the laundry is finished. In yet another embodiment, the communications may be an event retrieved from, for example, a personal calendar, such as a notification that the user has a conference call starting in ten minutes.

Optimized communications program 162 determines if an override is in effect (decision step 206). At decision step 206, optimized communications program 162 determines if an override is in effect that causes the message to be delivered immediately. In an embodiment, optimized communications program 162 may use a set of rules set up by the user in step 202 to allow certain communications, such as from a specific sender or a specific device, to be delivered immediately. For example, the user may setup a rule that any communication from a child of the user is delivered immediately. In another embodiment, optimized communications program 162 may determine from human intervention that the communications should be delivered immediately. For example, the user may tell a smart speaker to "notify me as soon as the airport driver arrives." If optimized communications program 162 determines that an override is in effect (decision 206, YES branch), then optimized communications program 162 proceeds to step 214. If optimized communications program 162 determines that an override is not in effect (decision 206, NO branch), then optimized communications program 162 proceeds to step 208 to determine the criticality of the communication.

Optimized communications program 162 determines the criticality of the communications (step 208). If optimized communications program 162 determines that an override is not in effect (decision step 206, "No" branch), then optimized communications program 162 establishes a criticality score. In an embodiment, optimized communications program 162 may use the default priority established in step 202 to determine the criticality score. In an embodiment, optimized communications program 162 may generate an index to derive the criticality score based on the initial default priorities established by the user in step 202 as well as inputs from other devices or applications in distributed data processing environment 100. In an embodiment, optimized communications program 162 may use a learning loop to modify the index over time. For example, the default priority for a Voice over IP (VoIP) telephone device might initially be established as a lower priority than for a television program, but over time, optimized communications program 162 may learn that the user typically will interrupt the television program to answer a VoIP telephone call, and therefore, optimized communications program 162 will modify the index to raise the priority of the VoIP telephone above the priority of the television program.

In an embodiment, data received from attached devices may modify the default priority of communications to be initiated with a user. For example, optimized communications program 162 may determine from a smart doorbell that a child of the user has arrived, and in response may override the default priority of the smart doorbell and set the criticality score of the message from the smart doorbell such that it will be delivered to the user immediately. In an embodiment, different communications from the same device or application may have different criticality scores. For example, a device such as a VoIP telephone may have a higher criticality score for a call from a child of the user than for a call with a restricted Caller ID. In another example, an application that monitors attached IoT devices may have a higher criticality score for communications from a smoke detector than for communications from laundry machines.

In an embodiment, when the intended recipient of the communication is not available to receive a communication, optimized communications program 162 may create a corpus of different pending communications for the intended recipient. This will allow optimized communications program 162 to optimize delivery of the communications when the intended recipient becomes available. For example, optimized communications program 162 may create bins of priority, such as high, medium, and low, and place messages destined for the user in those bins. For example, if optimized communications program 162 has established that the range of values for the criticality score is 1 (lowest) to 10 (highest), then optimized communications program 162 may assign communications with a criticality score in the range of 7 to 10 to the high priority bin, communications with a criticality score in the range of 4 to 6 to the medium priority bin, and communications with a criticality score in the range of 1 to 3 to the low priority bin. This will allow optimized communications program 162 to more efficiently deliver multiple communications in step 218.

Optimized communications program 162 determines availability of the recipient (step 210). At step 210, optimized communications program 162 determines the availability of the intended recipient of the communications based on current and planned activities of the intended recipient as determined from the data received from the one or more sources. In an embodiment, optimized communications program 162 may communicate with one or more sources, which may include computing device 110, microphone device 120, sensor 130, media device 140, or any combination thereof, to determine the activity level of the intended recipient. In an embodiment, the one or more sources may be divided into device classes, and processes defined for each class to determine activity. For example, the one or more sources may include a washing machine, dryer, oven, and microwave, and these sources may be put into the class "appliances."

In an embodiment, for each device or device class, optimized communications program 162 may determine the time remaining in the current activity of the intended recipient associated with that device or device class. For example, if the intended recipient is watching a program on media device 140, optimized communications program 162 may communicate with media device 140 to determine how much time is left in the program. In another example, if the intended recipient is exercising on a smart treadmill, optimized communications program 162 may communicate with the treadmill to determine how much time is remaining in the workout. In an embodiment, optimized communications program 162 may determine the nature of the programming on media device 140 by capturing audio from microphone device 120. For example, optimized communications program 162 may determine, from the audio captured by microphone device 120, that the football game on media device 140 will end in thirty seconds. Optimized communications program 162 may set a low availability score so the pending communication waits until the football game ends.

Optimized communications program 162 may communicate with the one or more sources in distributed data processing environment 100 to determine a level of interest by the intended recipient for the activity. For example, optimized communications program 162 may determine that the intended recipient is watching a program that ends in ten minutes, but also determines that the intended recipient frequently changes channels, so the level of interest in the current program is likely not high. Therefore, optimized communications program 162 may set a low availability score to allow pending communications to interrupt the current program.

Optimized communications program 162 may communicate with the various sensors in distributed data processing environment 100, including wearables and mobile devices, to establish a historical trendline of activity throughout the day with variation by location for the user. For example, on a weekday the data will be categorized by type of activity in one way because a user may be at work, while on the weekend, the data will categorized by type of activity in another way. Optimized communications program 162 may use this historical categorization to predict activity level of the user based on day and location. In an embodiment, optimized communications program 162 may use historical data to determine the time remaining in an activity. For example, optimized communications program 162 may determine that, based on historical data, a user normally works out for 25 minutes on a treadmill, and since the user is currently 23 minutes into the workout, optimized communications program 162 sets a low availability score to prevent delivery of the communications until the user finishes the workout. In an embodiment, optimized communications program 162 may update the historical data with the current activity.

In an embodiment, optimized communications program 162 may use a Likert scale to establish the level of activity of the user. A Likert scale is a scale in which responses are scored along a range. For example, optimized communications program 162 may setup the following scale based on the historical activity of the user: 1=Active, 2=Neutral, 3=Passive. In an embodiment, optimized communications program 162 may use the value of anticipated activity from the Likert scale to determine whether to initiate communications with the intended recipient. In an embodiment, default thresholds may be established in step 202.

In an embodiment, optimized communications program 162 may communicate with a personal calendar to determine the schedule of the intended recipient. Optimized communications program 162 may use this calendar data, for example, to determine if critical activities are planned by the intended recipient that would impact the ability to deliver communications when the current activity ends. For example, optimized communications program 162 may determine that the intended recipient has a one-hour conference call scheduled immediately after the conclusion of the program the intended recipient is watching. Optimized communications program 162 would then set a low availability score based on the lack of availability when the current activity ends.

In an embodiment, optimized communications program 162 may use any or all of the above techniques to determine an availability score for the pending communications.

Optimized communications program 162 determines the optimal time to initiate communications (step 212). In step 212, optimized communications program 162 determines the optimal time to initiate the communications based on the criticality score determined in step 208 and the availability score determined in step 210. In an embodiment, optimized communications program 162 may compare the criticality score determined in step 208 to the availability score determined in step 210 to determine the optimal time to initiate the communications with the intended recipient. In an embodiment, if the criticality score is higher than the availability score, optimized communications program 162 will determine to immediately initiate communications. In an embodiment, if the criticality score is lower than the availability score, then optimized communications program 162 will determine to not initiate communications with the intended recipient until the availability score changes and becomes lower than the criticality score. In an embodiment, if the criticality score is lower than the availability score, but within a threshold established in step 202, then optimized communications program 162 will determine not to initiate communications with the intended recipient until the next logical break in the current activity. For example, if a pending communications has a criticality score of 5 and the intended recipient has an availability score of 7, but the threshold established in step 202 is 3, then, since the difference between the criticality score and the availability score is less than or equal to 3, optimized communications program 162 will determine to initiate communications with the intended recipient as soon as a logical break is detected (e.g., the end of a sentence is reached, or the DVD player is paused).

In an embodiment, both the criticality score and the availability score may be in the range of 1 to 5. In another embodiment, both the criticality score and the availability score may be in the range of 1 to 100. In yet another embodiment, the criticality score and the availability score may have different ranges. In an embodiment, the score with the higher value may have the higher priority. In another embodiment, the score with the lower value may have the higher priority. In general, a person having ordinary skill in the art would recognize that any value of the range and any method of comparison of the criticality score and the availability score are acceptable to achieve the desired result.

Optimized communications program 162 determines if rules prohibit voice communications (decision step 214). At decision step 214, optimized communications program 162 determines if rules prohibit voice communications with the intended recipient. For example, there are laws that restrict the type of vocal feedback that a car can give to a driver. In another example, rules may prohibit using electronics devices on an airplane during certain parts of a flight. In yet another example, rules may prohibit use of any electronic devices while taking a standardized examination. If optimized communications program 162 determines that rules prohibit voice communications (decision step 214, "Yes" branch), the rules will override the criticality and availability scores, and the communications will be suspended until such time as the rules are no longer in effect (e.g., the intended recipient has parked the car). In an embodiment, optimized communications program 162 may crawl through web pages of appropriate laws for the current location of the intended recipient to determine if there are any rules prohibiting verbal communications. In an embodiment, optimized communications program 162 may set up default rules in step 202 to allow a user to select rules based on the location of the user. For example, optimized communications program 162 may set up a rule in step 202 preventing initiating communications when the user is in a place of worship or at a show.

Optimized communications program 162 initiates communications at the optimal time (step 216). If optimized communications program 162 determines that rules do not prevent voice communications (decision step 214, "No" branch), then optimized communications program 162 will initiate communications with the intended recipient at the optimal time determined in step 212. In an embodiment, if the criticality score is above a threshold established by the user in the system defaults (step 202), then optimized communications program 162 will immediately initiate communications with the intended recipient.

In an embodiment, optimized communications program 162 may communicate with microphone device 120 to determine if the intended recipient is engaged in a conversation. If optimized communications program 162 determines that the intended recipient is engaged in a conversation, then optimized communications program 162 may delay initiation of the communications until it determines there is a pause in the conversation. In an embodiment, optimized communications program 162 measures the rate of the conversation to determine if there are natural breaks during which the pending communications can be delivered. In an embodiment, optimized communications program 162 may use Natural Language Processing (NLP) to determine when a break occurs in the conversation to allow for an interruption. NLP is a branch of artificial intelligence that helps computers understand, interpret and manipulate human language. NLP includes many different techniques for interpreting human language, ranging from statistical and machine learning methods to rules-based and algorithmic approaches. Sentiment analysis, as part of NLP, may also be used to determine the stress level of the intended recipient. Optimized communications program 162 may use NLP to determine the optimal time to initiate the communications with the intended recipient based on the natural cadence of the conversation.

In another embodiment, If optimized communications program 162 determines that the intended recipient is engaged in a conversation, then optimized communications program 162 may use the Spreading Activation Label Propagation Algorithm (SALPA) in order to determine if the pending communications is related to the topic of the ongoing conversation. Spreading activation is the theory of how the brain iterates through a network of associated ideas to retrieve specific information. When a given message has a surrounding context that is similar, the user will likely respond better. For example, if the intended recipient is engaged in a conversation that involves "doctors," then a message that contains information about "nurses" will be received easier than a message that contains the topic "carrots". That is because typically speaking, "carrots" and "doctors" are not related, whereas "doctors" and "nurses" do have a semantic relationship. In an embodiment, optimized communications program 162 will use the SALPA to determine if the pending communication is related to the ongoing conversation, and, based upon this determination, may wait until the conversation ends before delivering the pending communication if the pending communication is not related to the ongoing conversation. For example, if the intended recipient has a low availability score, and optimized communications program 162 determines that the pending communication is about the weather, but the ongoing conversation is about doctors, since the pending communication is not related to the subject of the ongoing conversation, optimized communications program 162 may wait until it detects the conversation has ended before interrupting.

In an embodiment, optimized communications program 162 may use Cosine Similarity to calculate the similarity between the pending communication and the ongoing conversation. The pending communication and the ongoing conversation are vectorized, and the cosine similarity is applied to determine the angle between the vectors. The output of the cosine similarity is an angle between 0 and 90 degrees. As the angle approaches 0 degrees, the pending communication and the topic of the ongoing conversation are more similar. This indicates that optimized communications program 162 may interrupt the user at this time. As the angle approaches 90 degrees, the pending communication and the topic of the ongoing conversation are dissimilar. This indicates that optimized communications program 162 should not interrupt the user at this time. In an embodiment, optimized communications program 162 may set thresholds for determining similarity in step 202.

In an embodiment, optimized communications program 162 may use a Likert scale to determine whether or not to interrupt the ongoing conversation based on the result of the cosine similarity calculation. For example, the system can setup the following scale based on the angle calculated by the cosine similarity: 0-30: Similar, 31-60: Neutral, 61-90: Dissimilar. In an embodiment, these thresholds may be established in step 202. In an embodiment, optimized communications program 162 may employ a learning component to adjust the Likert scale over time. For example, if the user indicates after the fact a preference to not have been interrupted, or supplies some other form of feedback, optimized communications program 162 will learn from this. Optimized communications program 162 will dynamically adjust the Likert scale based on this feedback.

In an embodiment, optimized communications program 162 may use inputs from computing device 110, microphone device 120, or sensor 130 to determine the stress level of the intended recipient and compare it to a personal norm. For example, optimized communications program 162 may use heartrate data from a biometric sensor worn by the intended recipient and compare it to a baseline established by historical data collection, or to a default established in step 202. In an embodiment, optimized communications program 162 may use the results of sentiment analysis from step 208 to determine the stress level of the intended recipient. In an embodiment, if optimized communications program 162 determines an elevated stress level in the conversation, optimized communications program 162 may decide that the communication should be delayed, even though the criticality score is higher than the availability score.

In an embodiment, optimized communications program 162 may deliver messages from the bins created in step 208 based on the availability of the intended recipient. For example, if optimized communications program 162 determines that there is a small window of opportunity to deliver communications to the intended recipient, it may only deliver the communications in the high priority bin. If, instead, optimized communications program 162 determines that there are no current restrictions on communications with the recipient, optimized communications program 162 will send all the pending communications from all of the bins to the intended recipient.

FIG. 3 depicts examples of the operation of optimized communications program 162. In an example (Event 1), Sally is baking a cake but watching a show, and a communication that a timer has expired has been received by optimized communications program 162. Since the cake will burn if it is not removed, optimized communications program 162 determines that the criticality score is high (9 in this example). Optimized communications program 162 determines that Sally is watching a program by analyzing the data from the various devices, for example, microphone device 120 (audio data) or media device 140 (the television the program is playing on). Optimized communications program 162 will then lookup the program schedule, using any available online programming schedule, to determine when the program ends, and determines that the program just started. Since the show has just started, optimized communications program 162 determines that Sally is highly available (availability score set to 1 in this example), and since the criticality score (9) is higher than the availability score (1), optimized communications program 162 determines to immediately deliver the verbal timer communication to Sally.

In another example (Event 2), A robot is providing sales support in a local retail store. The robot comes over to Martin to help him, but determines that Martin is in the middle of a conversation with Craig. Optimized communications program 162 determines that the default criticality score for the pending communication in this example is 5. Optimized communications program 162 determines that the availability score in this example is 6. Since the criticality score is slightly lower than the availability score, optimized communications program 162 determines that the robot should wait until there is an observable pause in the conversation before interrupting Martin. Optimized communications program 162 uses Natural Language Processing to analyze the conversation and determine the optimal time to initiate communications with Martin.

In yet another example (Event 3), Mike has the laundry running in a smart washing machine while watching the football game with friends. When the laundry completes, optimized communications program 162 determines that the criticality score of the laundry notification is low (3 in this example). When optimized communications program 162 determines that Mike is watching a program by analyzing the data from, for example, media device 140, optimized communications program 162 uses learned data to determine that, although the default priority for the media device is low, due to the importance of the football game to Mike, for this program the availability score is high (7 in this example). Since the criticality score (3) is significantly lower than the availability score (7), optimized communications program 162 waits until a logical time (e.g., half time or end of the game) to deliver the verbal timer communication to Mike that the laundry is complete.

Figure 4:
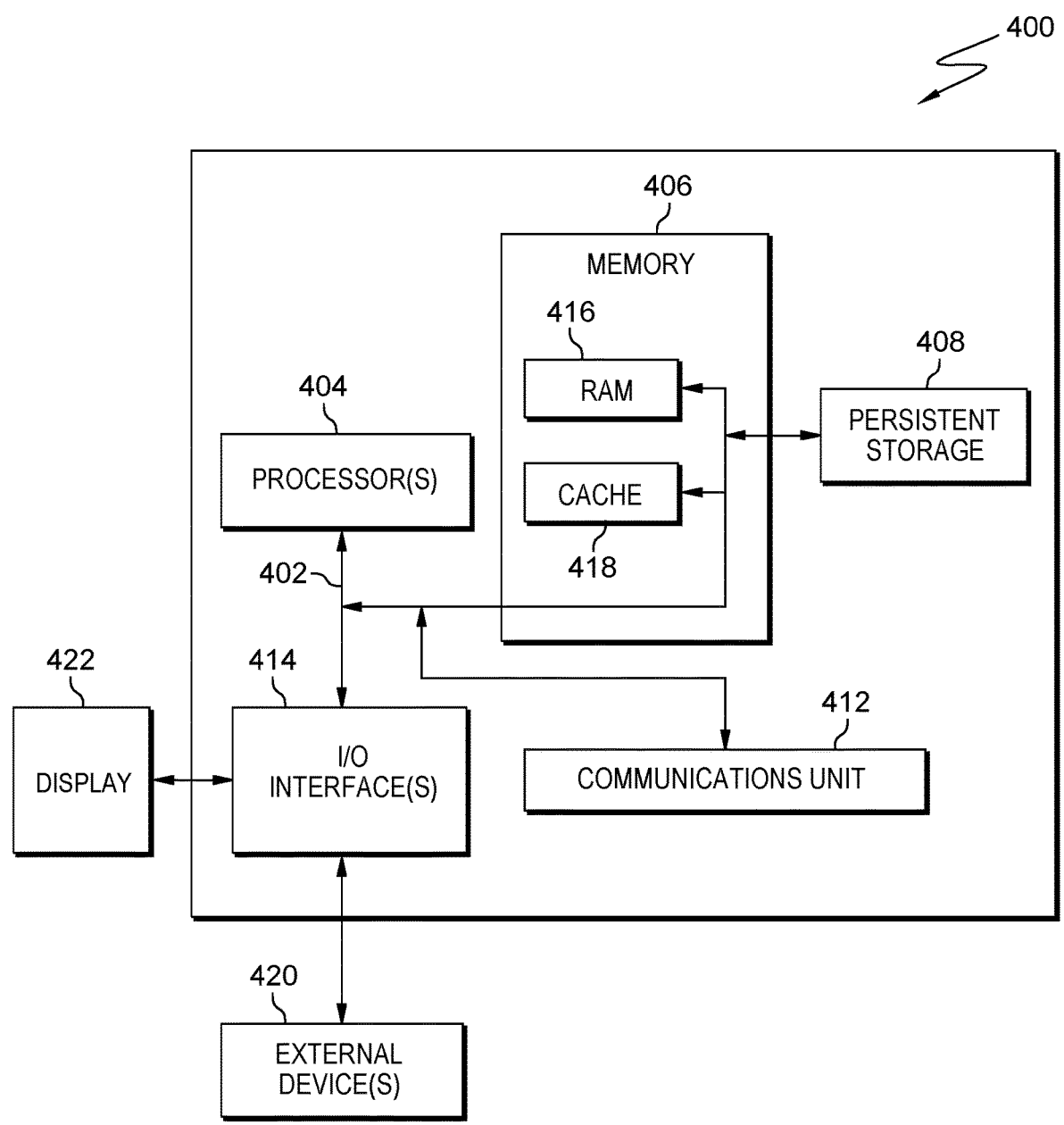
FIG. 4 depicts a block diagram of components of computing devices executing the optimized communications program within the distributed data processing environment of FIG. 1, in accordance with an embodiment of the present invention.

FIG. 4 depicts a block diagram of components of server device 160 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server device 160 can include processor(s) 404, cache 418, memory 406, persistent storage 408, communications unit 412, input/output (I/O) interface(s) 414 and communications fabric 402. Communications fabric 402 provides communications between cache 418, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 418 is a fast memory that enhances the performance of processor(s) 404 by holding recently accessed data, and data near recently accessed data, from memory 406.

Program instructions and data used to practice embodiments of the present invention, e.g., optimized communications program 162, data from computing device 110, microphone device 120, sensor 130, and media device 140 are stored in persistent storage 408 of server device 160 for execution and/or access by one or more of the respective processor(s) 404 of server device 160 via memory 406. In one embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Optimized communications program 162, data from computing device 110, microphone device 120, sensor 130, and media device 140 may be downloaded to persistent storage 408 of server device 160 through communications unit 412.

I/O interface(s) 414 allows for input and output of data with other devices that may be connected to computing device 110, microphone device 120, sensor 130, and media device 140. For example, I/O interface(s) 414 may provide a connection to external device(s) 420 such as a keyboard, a keypad, a touch screen, a microphone, a digital camera, and/or some other suitable input device. External device(s) 420 can also include portable computer readable storage media such as, for example, thumb drives, portable optical or magnetic disks, and memory cards. Software and data used to practice embodiments of the present invention, e.g., optimized communications program 162, computing device 110, microphone device 120, sensor 130, and media device 140, can be stored on such portable computer readable storage media and can be loaded onto persistent storage 408 via I/O interface(s) 414. I/O interface(s) 414 also connect to a display 422. Software and data used to practice embodiments of the present invention, e.g., optimized communications program 162, computing device 110, microphone device 120, sensor 130, and media device 140, can be stored on such portable computer readable storage media and can be loaded onto persistent storage 408 via I/O interface(s) 414.

Display 422 provides a mechanism to display data to a user and may be, for example, a computer monitor. Display 422 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for optimizing interactive communications with a computing device, the computer-implemented method comprising the steps of:

receiving, by one or more computer processors, a set of system defaults;

receiving, by one or more computer processors, a verbal communication for an intended recipient;

receiving, by one or more computer processors, an activity data for the intended recipient from a one or more sources;

determining, by one or more computer processors, a criticality score of the verbal communication based on the set of system defaults;

determining, by one or more computer processors, an availability score for the intended recipient based on the set of system defaults and the activity data;

determining, by one or more computer processors, an optimal time to initiate the verbal communication with the intended recipient, wherein the optimal time to initiate the verbal communication occurs when the criticality score exceeds the availability score; and initiating, by one or more computer processors, the verbal communication for the intended recipient at the optimal time.

2. The computer-implemented method of claim 1, wherein initiating, by one or more computer processors, the verbal communication for the intended recipient at the optimal time comprises:

determining, by one or more computer processors, whether a rule prohibits verbal communications at the optimal time; and responsive to determining that the rule does not prohibits verbal communications at the optimal time, initiating, by one or more computer processors, the verbal communication for the intended recipient.

3. The computer-implemented method of claim 1, wherein initiating, by one or more computer processors, the verbal communication for the intended recipient at the optimal time comprises:

receiving, by one or more computer processors, a verbal data for an ongoing conversation by the intended recipient from the one or more sources;

determining, by one or more computer processors, an end of a current sentence of the ongoing conversation using natural language processing; and responsive to determining the end of the current sentence, initiating, by one or more computer processors, the verbal communication with the intended recipient.

4. The computer-implemented method of claim 1, wherein initiating, by one or more computer processors, the verbal communication for the intended recipient at the optimal time comprises:

receiving, by one or more computer processors, a verbal data for an ongoing conversation by the intended recipient from the one or more sources;

modifying, by one or more computer processors, the verbal data for the ongoing conversation using a spreading activation label propagation algorithm to create a context data;

modifying, by one or more computer processors, the context data using cosine similarity to create a similarity score; and responsive to the similarity score being greater than a threshold, initiating, by one or more computer processors, the verbal communication with the intended recipient.

5. The computer-implemented method of claim 1, wherein initiating, by one or more computer processors, the verbal communication for the intended recipient at the optimal time comprises:

receiving, by one or more computer processors, a verbal data for an ongoing conversation by the intended recipient from the one or more sources;

receiving, by one or more computer processors, a biometric data for the intended recipient from the one or more sources;

determining, by one or more computer processors, a stress level for the intended recipient based on the verbal data and the biometric data; and responsive to determining the stress level for the intended recipient being less than a threshold, initiating, by one or more computer processors, the communication with the intended recipient.

6. The computer-implemented method of claim 1, wherein determining, by one or more computer processors, a criticality score of the verbal communication comprises:

receiving, by one or more computer processors, a historical level of activity for the intended recipient; and determining, by one or more computer processors, a criticality score of the verbal communication based on the set of system defaults and the historical level of activity.

7. The computer-implemented method of claim 6, further comprising updating, by one or more computer processors, the historical level of activity for the intended recipient based on the activity data.

8. The computer-implemented method of claim 1, comprising:

determining, by one or more computer processors, whether an override of the optimal time is in effect based on the set of system defaults; and responsive to the override of the optimal time is in effect, initiating, by one or more computer processors, the verbal communication with the intended recipient.

9. A computer program product for optimizing interactive communications with a computing device, the computer program product comprising:

one or more computer readable storage media; and program instructions stored on the one or more computer readable storage media, the program instructions comprising:

program instructions to receive a set of system defaults;

program instructions to receive a verbal communication for an intended recipient;

program instructions to receive an activity data for the intended recipient from a one or more sources;

program instructions to determine a criticality score of the verbal communication based on the set of system defaults;

program instructions to determine an availability score for the intended recipient based on the set of system defaults and the activity data;

program instructions to determine an optimal time to initiate the verbal communication with the intended recipient, wherein the optimal time to initiate the verbal communication occurs when the criticality score exceeds the availability score; and program instructions to initiate the verbal communication for the intended recipient at the optimal time.

10. The computer program product of claim 9, wherein initiating the verbal communication for the intended recipient at the optimal time comprises program instructions, stored on the one or more computer readable storage media, to:

determine whether a rule prohibits verbal communications at the optimal time; and responsive to determining that the rule does not prohibits verbal communications at the optimal time, initiate the verbal communication for the intended recipient.

11. The computer program product of claim 9, wherein initiating the verbal communication for the intended recipient at the optimal time comprises program instructions, stored on the one or more computer readable storage media, to:
receive a verbal data for an ongoing conversation by the intended recipient from the one or more sources;
determine an end of a current sentence of the ongoing conversation using natural language processing; and
responsive to determining the end of the current sentence, initiate the verbal communication with the intended recipient.

12. The computer program product of claim 9, wherein initiating the verbal communication for the intended recipient at the optimal time comprises program instructions, stored on the one or more computer readable storage media, to:
receive a verbal data for an ongoing conversation by the intended recipient from the one or more sources;
modify the verbal data for the ongoing conversation using a spreading activation label propagation algorithm to create a context data;
modify the context data using cosine similarity to create a similarity score; and
responsive to the similarity score being greater than a threshold, initiate the verbal communication with the intended recipient.

13. The computer program product of claim 9, wherein initiating the verbal communication for the intended recipient at the optimal time comprises program instructions, stored on the one or more computer readable storage media, to:
receive a verbal data for an ongoing conversation by the intended recipient from the one or more sources;
receive a biometric data for the intended recipient from the one or more sources;
determine a stress level for the intended recipient based on the verbal data and the biometric data; and
responsive to determining the stress level for the intended recipient being less than a threshold, initiate the communication with the intended recipient.

14. The computer program product of claim 9, wherein determining a criticality score of the verbal communication comprises program instructions, stored on the one or more computer readable storage media, to:
receive a historical level of activity for the intended recipient; and
determine a criticality score of the verbal communication based on the set of system defaults and the historical level of activity.

15. A computer system for optimizing interactive communications with a computing device, the computer system comprising:
one or more computer processors;
one or more computer readable storage media; and
program instructions stored on the one or more computer readable storage media for execution by at least one of the one or more computer processors, the stored program instructions comprising:
program instructions to receive a set of system defaults;
program instructions to receive a verbal communication for an intended recipient;
program instructions to receive an activity data for the intended recipient from a one or more sources;
program instructions to determine a criticality score of the verbal communication based on the set of system defaults;
program instructions to determine an availability score for the intended recipient based on the set of system defaults and the activity data;
program instructions to determine an optimal time to initiate the verbal communication with the intended recipient, wherein the optimal time to initiate the verbal communication occurs when the criticality score exceeds the availability score; and
program instructions to initiate the verbal communication for the intended recipient at the optimal time.

16. The computer system of claim 15, wherein initiating the verbal communication for the intended recipient at the optimal time comprises program instructions, stored on the one or more computer readable storage media for execution by at least one of the one or more computer processors, to:
determine whether a rule prohibits verbal communications at the optimal time; and
responsive to determining that the rule does not prohibits verbal communications at the optimal time, initiate the verbal communication for the intended recipient.

17. The computer system of claim 15, wherein initiating the verbal communication for the intended recipient at the optimal time comprises program instructions, stored on the one or more computer readable storage media for execution by at least one of the one or more computer processors, to:
receive a verbal data for an ongoing conversation by the intended recipient from the one or more sources;
determine an end of a current sentence of the ongoing conversation using natural language processing; and
responsive to determining the end of the current sentence, initiate the verbal communication with the intended recipient.

18. The computer system of claim 15, wherein initiating the verbal communication for the intended recipient at the optimal time comprises program instructions, stored on the one or more computer readable storage media for execution by at least one of the one or more computer processors, to:
receive a verbal data for an ongoing conversation by the intended recipient from the one or more sources;
modify the verbal data for the ongoing conversation using a spreading activation label propagation algorithm to create a context data;
modify the context data using cosine similarity to create a similarity score; and
responsive to the similarity score being greater than a threshold, initiate the verbal communication with the intended recipient.

19. The computer system of claim 15, wherein initiating the verbal communication for the intended recipient at the optimal time comprises program instructions, stored on the one or more computer readable storage media for execution by at least one of the one or more computer processors, to:
receive a verbal data for an ongoing conversation by the intended recipient from the one or more sources;
receive a biometric data for the intended recipient from the one or more sources;
determine a stress level for the intended recipient based on the verbal data and the biometric data; and
responsive to determining the stress level for the intended recipient being less than a threshold, initiate the communication with the intended recipient.

20. The computer system of claim 15, wherein determining a criticality score of the verbal communication comprises program instructions, stored on the one or more computer readable storage media for execution by at least one of the one or more computer processors, to:
- receive a historical level of activity for the intended recipient; and
- determine a criticality score of the verbal communication based on the set of system defaults and the historical level of activity.

* * * * *